(12) United States Patent
LaBolt (10) Patent No.: US 6,364,093 B1
(45) Date of Patent: Apr. 2, 2002

(54) WALKING BEAM CONVEYOR AND METHOD

(75) Inventor: Steven D. LaBolt, North Canton, OH (US)

(73) Assignee: Boltech, Inc., Youngstown, OH (US)

( * ) Notice: Subject to any disclaimer, the term of this patent is extended or adjusted under 35 U.S.C. 154(b) by 0 days.

(21) Appl. No.: 09/512,853

(22) Filed: Feb. 25, 2000

(51) Int. Cl.$^7$ ............................................... B65G 25/00
(52) U.S. Cl. ......................................................... 198/775
(58) Field of Search .............................. 198/775, 774.2; 414/749.1

(56) References Cited

U.S. PATENT DOCUMENTS

| | | | |
|---|---|---|---|
| 1,964,297 A | * 6/1934 | Moser et al. | |
| 3,221,870 A | * 12/1965 | Pagay | |
| 3,985,496 A | * 10/1976 | Eickelberg | 432/122 |
| 4,040,514 A | 8/1977 | Pielsticker | |
| 4,071,137 A | 1/1978 | Fink | |
| 4,219,113 A | 8/1980 | Fieser | |
| 4,236,626 A | * 12/1980 | Noe | 198/774 X |
| 4,270,655 A | 6/1981 | Noe | |
| 4,330,262 A | 5/1982 | Kranzl | |
| 4,466,792 A | 8/1984 | Ballabene | |
| 4,501,352 A | * 2/1985 | Yanagisawa et al. | 198/775 |
| 4,538,721 A | 9/1985 | Westman | |
| 4,919,254 A | 4/1990 | Bricmont | |
| 4,928,811 A | 5/1990 | Waineo | |
| 5,332,079 A | * 7/1994 | Ueda et al. | 198/457 |
| 5,653,329 A | 8/1997 | McTaggart | |

* cited by examiner

Primary Examiner—Stephen T. Gordon
Assistant Examiner—Lori L Coletta
(74) Attorney, Agent, or Firm—Robert R. Hussey Co., LPA (57) ABSTRACT

A walking beam conveyor for the intermittent movement of articles along a transport path is disclosed. Fixed holders are positioned along the transport path to receive the articles to be advanced, providing at least two actuating stations at spaced apart locations along the transport path. To move the articles between the actuating stations, first and second rollers are provided and are supported by a support surface so the rollers are movable therealong. Support links are pivotally mounted to their respective rollers about the rotational axis of the rollers. A connecting link interconnects the support links to substantially synchronize movement of the support links. A beam is pivotally secured to the support links and is consequently supported by the rollers and extends between the actuating stations. The beam has movable supports secured thereto for supporting the article when it is move between the actuating stations. A vertical driving device such as a hydraulic cylinder moves the beam between an article supporting or raised position, in which the article is supported by one of the movable supports, and a retracted or lowered position in which the article is supported by one of the fixed holders. The hydraulic cylinder has one end connected to the beam and the other end pivotally connected to one of the support links so that upon actuation of the hydraulic cylinder, the beam is moved between the articles supporting position and the retracted position. The hydraulic cylinder is pivotally connected to the support links on each side of the beam by a crosslink. The ratio of the distance between the rotational axis of the roller and the pivot point connecting the beam to the support link and the distance between the rotational axis of the roller and pivotal axis where the support link connects to the hydraulic cylinder is from between 1:2 to 1:3. A drive motor moves the beam along the support surface to move the article between the actuating stations A maintenance hood is provided for covering the hydraulic cylinder in a covering position and exposing the hydraulic cylinder for maintenance in an open position. The connecting links are connected to the support links so that the distance of a line interconnecting the connection points of adjacent support links and connecting links from the axis of each roller is substantially maximized. A method for operating such an apparatus is also disclosed.

15 Claims, 9 Drawing Sheets

WALKING BEAM CONVEYOR AND METHOD

BACKGROUND OF THE INVENTION

This invention relates to a walking beam conveyor and more particularly to a walking beam conveyor for the intermittent movement of articles along a curved or linear transport path and is particularly suitable for moving heavy high-density loads and a method for operating such an apparatus.

Walking beam conveyors are provided for use in a wide variety of manufacturing machines and processes. For example, walking beam conveyors are used to support and move heavy articles along a transport path by lifting the article from an initial or first position at a first actuating station, transporting it to a second position, lowering the article so that it is supported in a stationary position at a second actuating station and returning to the first position to lift another article at the first actuating station while also lifting the article at the second actuating station and move both of those articles along the transport path. Such articles may be coils of sheet material, such as steel and the like, having a weight of many tons.

Of course, it will be appreciated that the walking beam type conveyors of the present invention disclosed herein are exemplary in nature and that the invention is not limited to use in steelmaking or handling generally. The walking beam conveyor and method of the present invention may be applied in any of a wide variety of applications which require movement of an article or articles along a linear or curved path to achieve the ends of a given manufacturing process or operation.

Walking beam or reciprocating conveyors for progressively moving an article along a linear path are well-known in the prior art (U.S. Pat. No. 4,219,113).

Some of these devices provide for the use of cams and linkages to raise, lower, and move the walking beam. U.S. Pat. No 4,928,811 provides a walking beam using a combination of Scotch yoke linkage and cam rollers to advance an article along a path. The use of a single motor is provided to drive a walking beam both along the transport path and to raise and lower the articles is provided but a very complicated linkage and beam system is required. U.S. Pat. No. 5,653,392 provides an accumulating conveyor system which raises and lowers a beam by means of a motor driven cam connected to a linkage which moves the beam in an vertical direction and supports the beam so that it can move along the linkage. Another cam-linkage device is disclosed in U.S. Pat. No. 4,040,514.

Other known devices provide for the use of ramps to raise and lower the walking beam. U.S. Pat. No. 4,919,254 provides a walking beam apparatus which supports the beam on ramps to move the beam in a vertical direction as it moves in a horizontal direction. The use of a flexible drive transmitting member such as a cable or chain is used in conjunction with ramps to provide a walking beam furnace so that the walking beam can be lowered beyond its operative stroke to a maintenance position as shown in U.S. Pat. No. 4,466,792. Another patent showing a walking beam furnace using ramps is shown in U.S. Pat. No. 4,330,262 for ready maintenance of a walking beam furnace.

Jacks have also been disclosed for raising and lowering the walking beam in U.S. Pat. No. 4,270,655. Air lifting units to raise and lower the walking beam are disclosed in U.S. Pat. Nos. 4,219,113 and 4 071,137.

It is desirable to provide a simplified linkage and mechanism to raise and lower a walking beam. It is also desirable to provide simplified crank arm geometry for raising and lowering a walking beam. It is further desirable to create the vertical lift motion of the walking beam with one lift cylinder. An additional desirable feature is to mount the vertical driving device, such as a lift cylinder, as close to the top of the walking beam as possible. Such a design allows for simplified maintenance and also improved control since synchronizing the flow control of the fluid used to move the cylinder is not necessary, such as in the case when two cylinders are used. Such desirable features also provide a walking beam conveyor that is easily and efficiently manufactured, installed and maintained.

It is also desirable to provide a linkage design that maximizes the force for raising and lowering the walking beam. Such a feature allows for greater loads to be raised and lowered by the walking beam with vertical lifting devices requiring less space.

It is desirable to provide for easy maintenance of the driving mechanism for a walking beam conveyor and also to protect the mechanism from physical damage and contamination by dust, dirt or other foreign particles. By providing quick access to the drive mechanism without removing or disassembly of the walking beam conveyor, maintenance time is minimized and also the possibility of incorrect reassembly of the walking beam after the maintenance is completed. This feature is important since downtime for maintenance or repair of the walking beam conveyor and consequently the entire production line is decreased.

It also desirable to provide a maintenance hood which acts as a structural member to support the articles as they are supported by the walking beam conveyor and moved between the stations. Such a maintenance hood allows mounting of a vertical driving device, such as a lift cylinder, as close to the top of the walking beam as possible. Such a maintenance hood also allows for flexibility in the positioning of the drive mechanism and more efficient design utilization of the space required for the linkage in the walking beam conveyor. It is also desirable to provide quick access to the vertical lifting device for maintenance.

It is also desirable to minimize the space required by lift mechanism to raise and lower the walking beam in a linkage used to raise and lower a walking beam. It is desirable to provide pivotal connections which have ease of maintenance and decreased manufacturing costs. It is desirable to provide a linkage to raise and lower a walking beam which allows the wheelbase or distance between wheels on each side of the walking beam be varied depending various design configurations of the manufacturing operations in which the walking beam conveyor is used. It is further desirable to simply change the wheelbase of a walking beam conveyor by simply changing the length of connecting links.

SUMMARY OF THE PRESENT INVENTION

The present invention provides a walking beam conveyor and a method for operating such an apparatus with the above described desirable features that may be implemented in a wide variety of walking beam conveyor designs.

The walking beam conveyor of the present invention provides for the intermittent movement of articles along a transport path. Fixed holders are positioned along the transport path to temporarily receive the articles to be advanced. These fixed holders provide a series of actuating stations at spaced apart locations along the transport path to temporarily receive the articles as they are advanced along the transport path. The walking beam conveyor provides for movement of the articles between the actuating stations and includes a first and second set of rollers which are supported by a support surface with the rollers movable their along. Support links are pivotally secured to each of the rollers about the rotational axis of their respective rollers and connecting links are provided to interconnect the support links and thereby substantially synchronize movement of the support links, accordingly creating the lift motion of the walking beam.

The present invention provides a beam which is pivotally secured to the support links and is consequently supported by the rollers for movement along the transport path. Each set of rollers include a roller positioned on each side of the beam. The beam extends between the actuating stations. The beam has movable supports secured thereto for receiving and supporting the article as it is moved between the actuating stations.

The linkage of the present invention allows for the use of a single hydraulic cylinder to move the beam between an article supporting or raised position, in which the article is supported by one of the movable supports on the beam, and a retracted or lowered position in which the article is supported by one of the fixed holders at an actuating station. The hydraulic cylinder has one end connected to the beam and the other end pivotally connected to one of the support links so that upon actuation of the hydraulic cylinder, the beam is moved between the article supporting position and the retracted position. A crosslink is provided to pivotally connect the support links on each side of the beam to the hydraulic cylinder. Upon actuation of the hydraulic cylinder, the support links are rotated to consequently move the beam between the article supporting position and the retracted position.

The ratio of the distance between the rotational axis of the roller/support link and the pivot point connecting the beam to the support link and the distance between the rotational axis of the roller/support link and the pivot axis where the support link connects to the hydraulic cylinder is from between 1:2 to 1:3. It has been found that this ratio is preferred to provide sufficient lifting force on the beam and the vertical travel of the beam within the physical and design parameters required to achieve other favorable features of the present invention.

A drive motor is provided to move the beam along the support surface and consequently move the articles between the actuating stations. A maintenance hood is provided for covering the hydraulic cylinder during normal operation of the walking beam conveyor of the present invention. The maintenance hood is movable between a covering position, in which the hydraulic cylinder is covered during normal operation of the walking beam conveyor, and an open position in which the hydraulic cylinder may be maintained.

The present invention provides the desirable feature of providing a simplified linkage, mechanism and crank arm geometry to raise and lower a walking beam. The vertical lift motion of the walking beam is created with one lift cylinder which is mounted close to the top of the walking beam. By using one lift cylinder simplified maintenance and also improved control is provided by the present. The walking beam conveyor is easily and efficiently manufactured, installed and maintained.

The present invention provides a linkage design that maximizes the force for raising and lowering the walking beam which allows for greater loads to be raised and lowered by the walking beam with a vertical lifting device requiring less space. Accordingly the size of the lift cylinder may be optimized to thereby minimize the cost of manufacture.

The maintenance hood of the present invention and the mounting of the lift cylinder close to the top of the walking beam, provides for easy maintenance of the lifting device and also protects the mechanism from physical damage and contamination by dust, dirt or other foreign particles. The maintenance hood also provides quick access to the drive mechanism without removing or disassembly of the walking beam conveyor, and maintenance time is minimized as is the possibility of incorrect reassembly of the walking beam after the maintenance is completed. Such a design feature is important since downtime for maintenance or repair of the walking beam conveyor and consequently the entire production line is decreased. The maintenance hood also acts as a structural member to support the articles as they are supported by the walking beam conveyor and moved between the actuating stations.

The maintenance hood of the present invention allows for mounting a vertical driving device, such as the lift cylinder, as close to the top of the walking beam as possible. Such a maintenance hood also allows for flexibility in the positioning of the drive mechanism and more efficient design utilization of the space required for the linkage in the walking beam conveyor. The design of the present invention minimizes the space required by the vertical driving device and the linkage used to raise and low lower a walking beam.

The walking beam conveyor of the present invention provides pivotal connections which utilize split bushings to connect some of the linkage members. The use of the split bushings allow for ease of maintenance and decreased manufacturing costs. The linkage of the present invention allows the wheelbase or distance between wheels on each end of the walking beam be varied depending on the various design configurations of the manufacturing operations in which the walking beam conveyor is used. This is achieved by simply changing the length of connecting links.

Other desirable features and advantages of the present invention will become apparent from a study of the following description and the accompanying drawings which are illustrative of the invention.

DETAILED DESCRIPTION OF THE INVENTION

Figure 1:
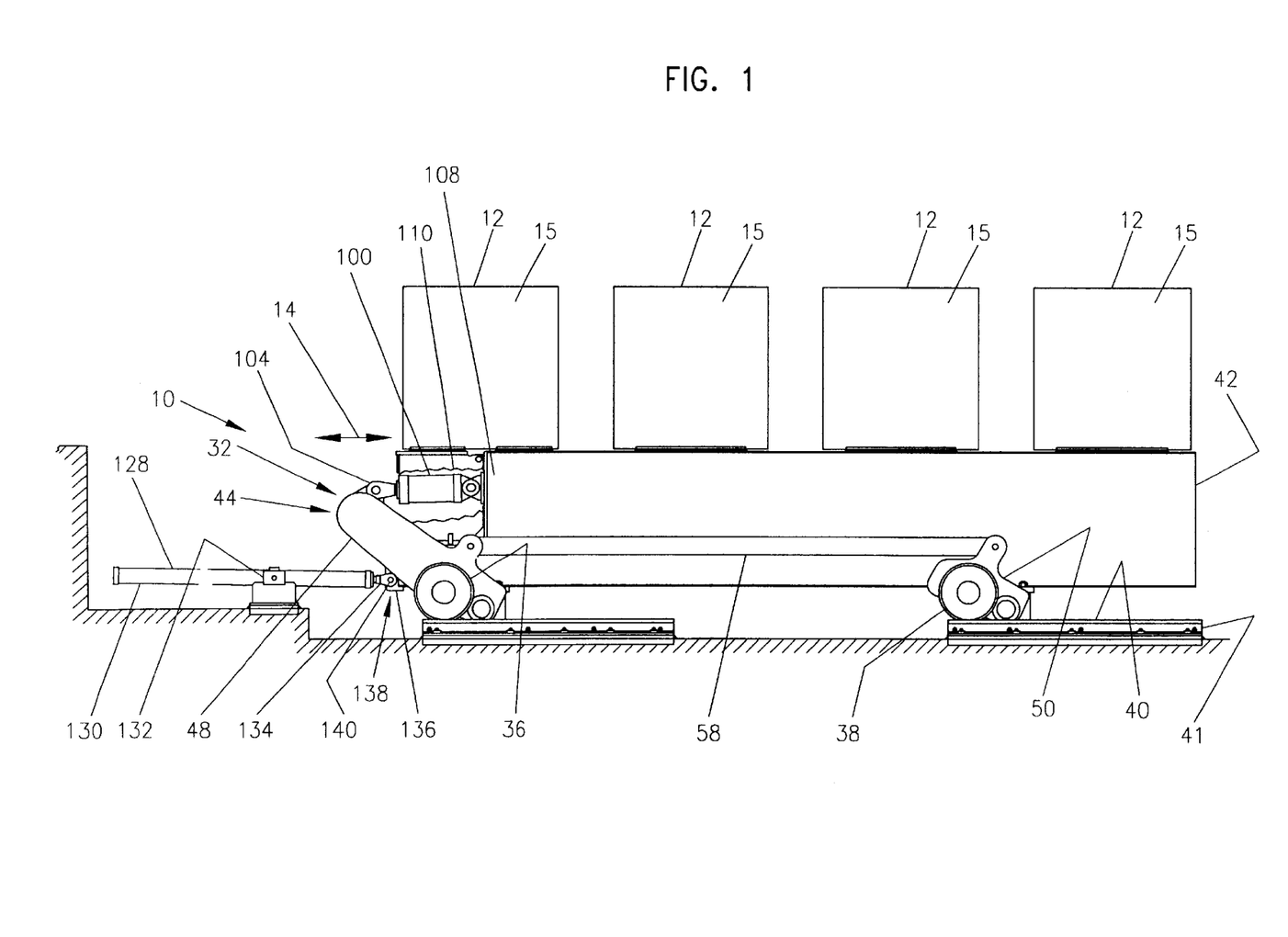
FIG. 1 is a side view of the walking beam conveyor of the present invention in a loading or forward position.
Figure 2:
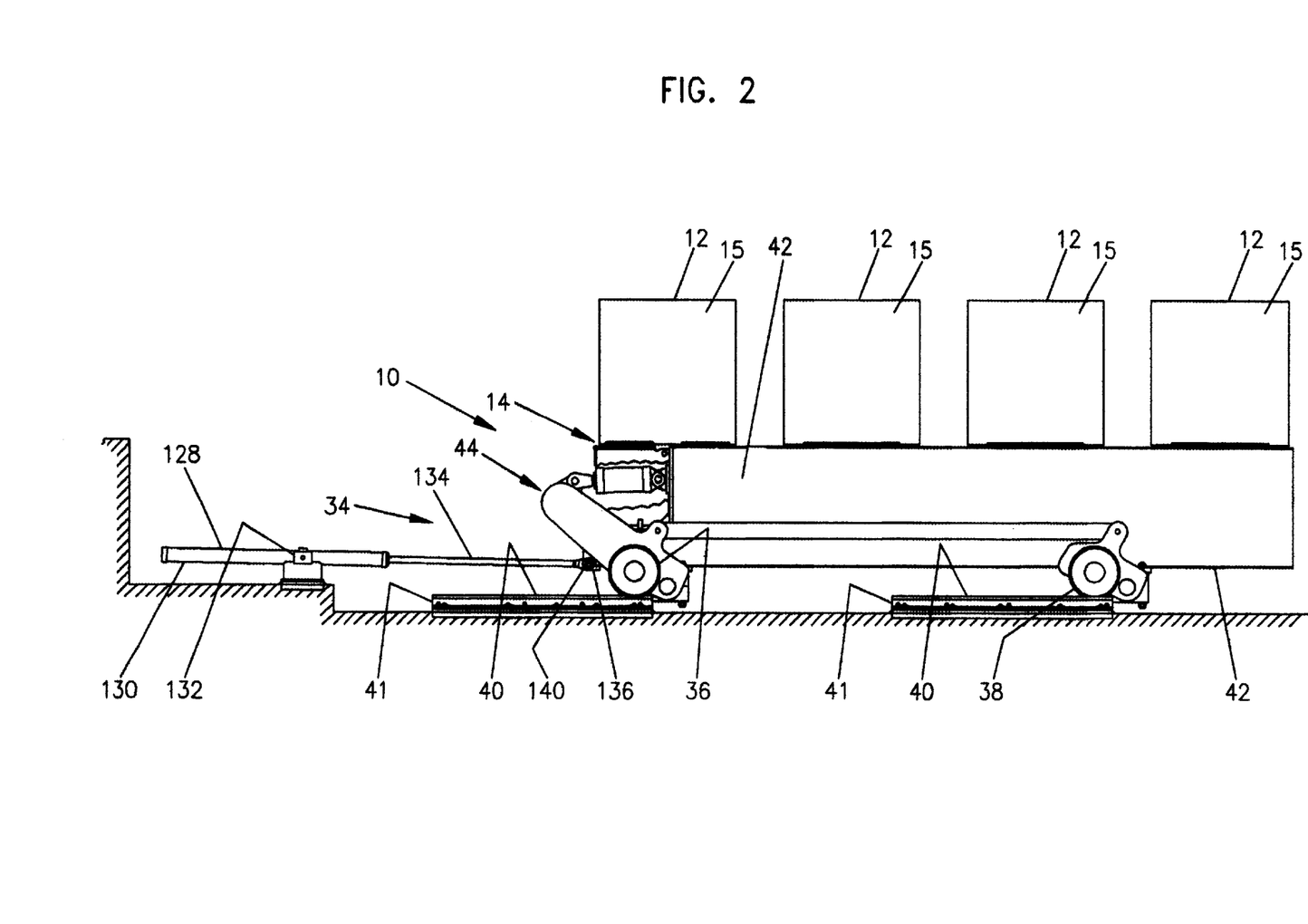
FIG. 2 is a side view of the walking beam conveyor of the present invention in an unloading or extended position.
Figure 3:
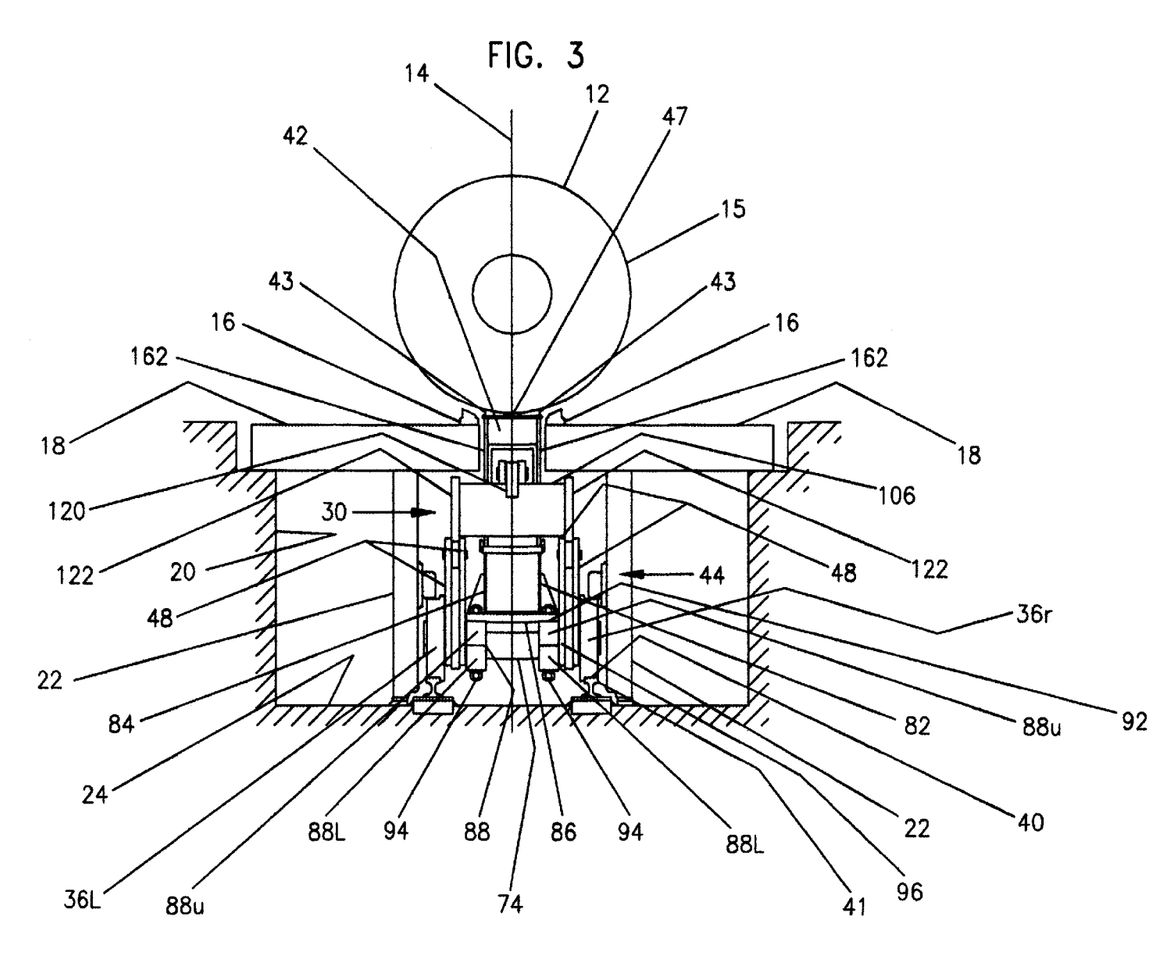
FIG. 3 is a front view of the walking beam conveyor of the present invention with the beam in a raised positioned.
Figure 4:
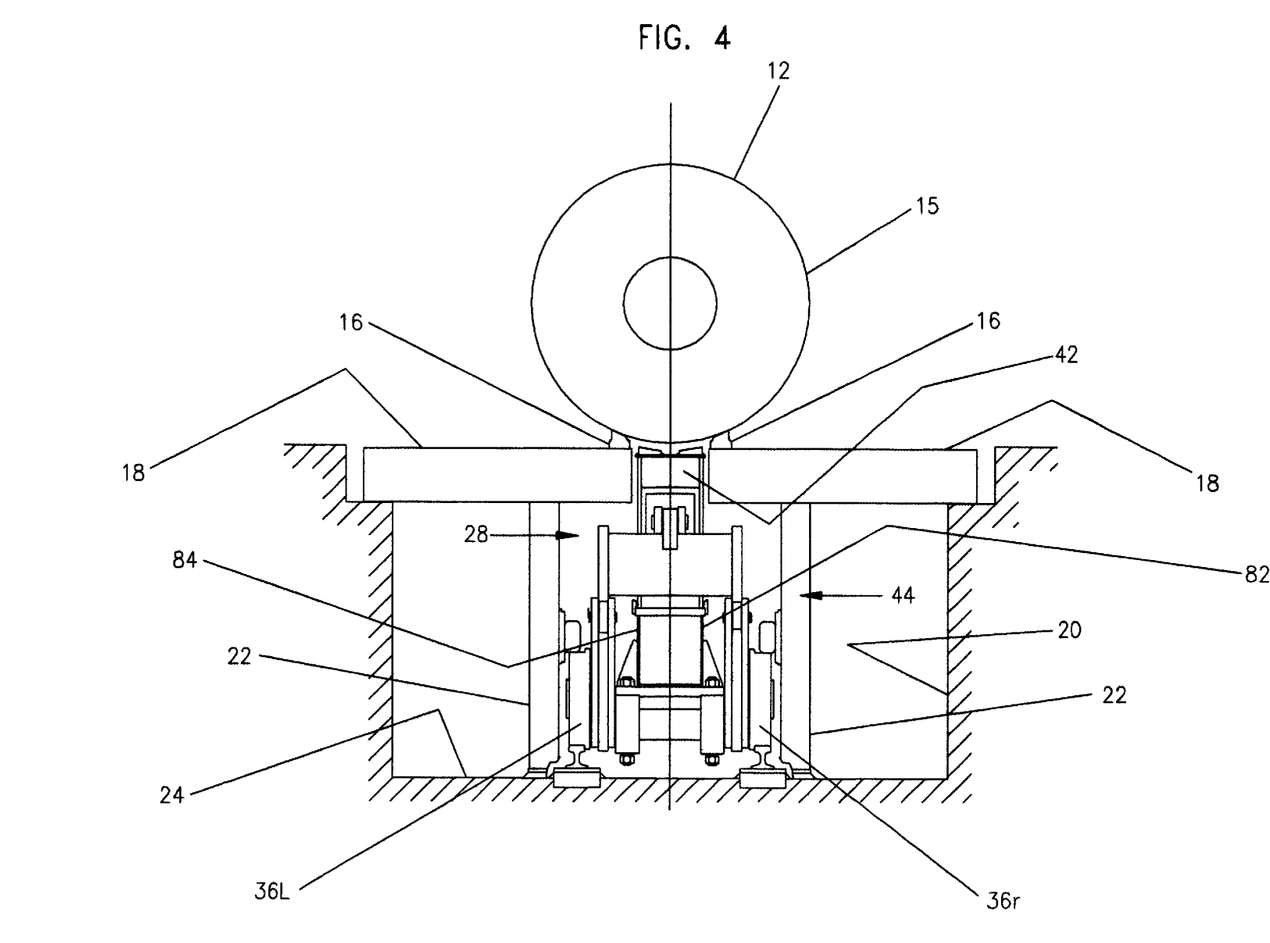
FIG. 4 is a front view of the walking beam conveyor of the present invention with the beam in a lowered position.
Figure 5:
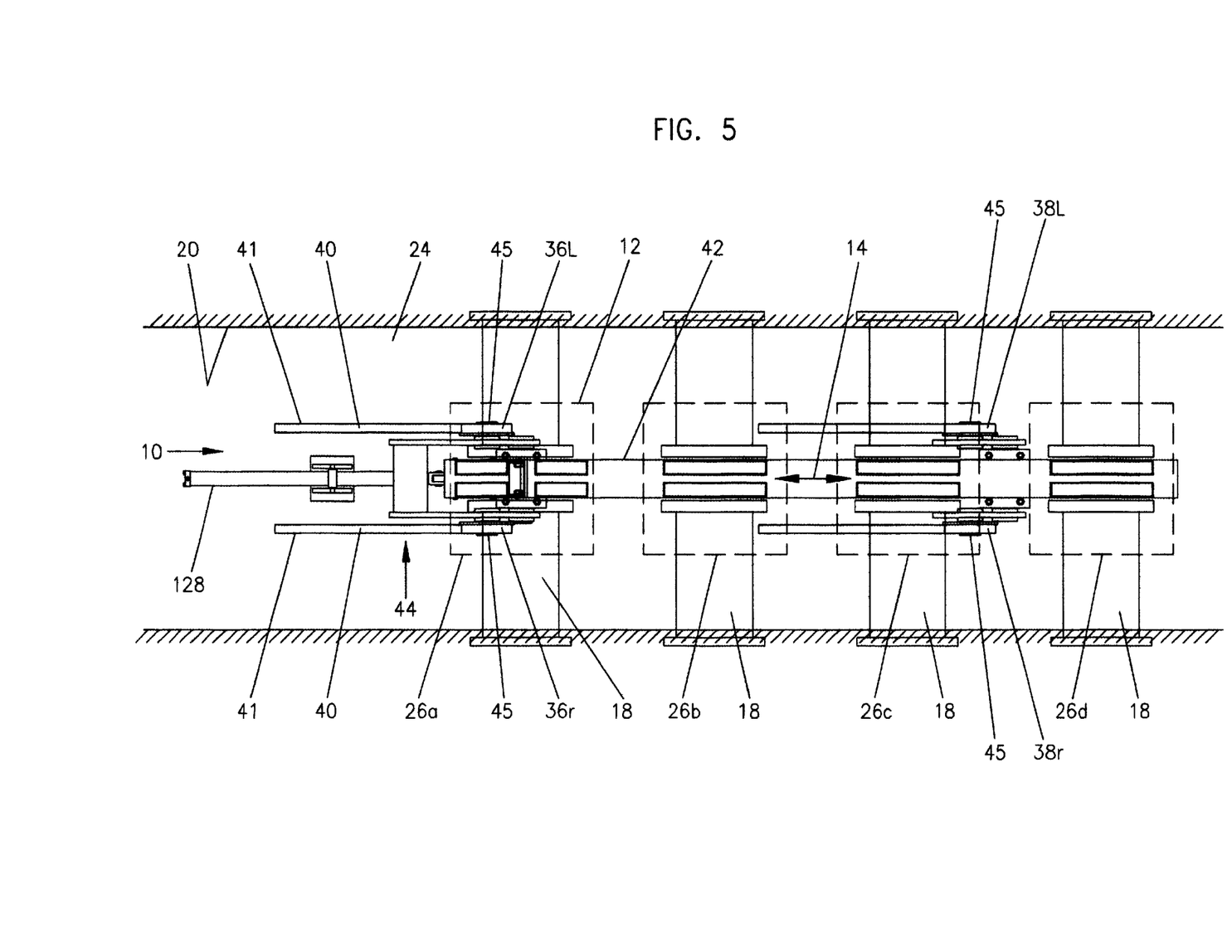
FIG. 5 is a top view of the walking beam conveyor of the present invention.

The walking beam conveyor 10 of the present invention, as shown in FIGS. 1 and 2, provides for the intermittent movement of articles 12 along a transport path 14. The articles 12, shown in the FIGS. 1–14, are rolls of steel having an outer peripheral surface 15. It should be understood that the conveyor 10 can move a wide variety of articles having different configurations and weights. Fixed holders 16, sometimes referred to as liners, are positioned along the transport path 14 to temporarily receive the articles 12 to be advanced, as shown in FIGS. 3, 4 and 5. The fixed holders 16 are secured in a fixed position and are mounted to their respective fixed liner support members 18. Each of the fixed liner support members 18 are held in a stationary position and have one end mounted on the edge of the conveyor pit 20. The fixed liner support members are also supported by a vertical support member 22 supported and positioned on the bottom surface 24 of the pit 20 and extending upwardly and secured to the fixed liner support member 18. It should be understood that there are a wide variety of designs that can be used to fix the fixed holders 16 along the transport path 14. The fixed holders 16 provide a series of spaced apart actuating stations 26a, 26b, 26c, and 26d at spaced apart locations along the transport path 14 to temporarily receive and/or store the articles 12 as they are advanced along the transport path.

The walking beam conveyor 10 provides for movement of the articles 12 between the actuating stations 26a–26d by picking up an article 12 located at one or all of the actuating stations 26a, 26b or 26c, by moving the walking beam conveyor from a retracted or lowered position 28, shown in FIG. 4, to an article supporting or raised position 30 shown in FIG. 3. The walking beam conveyor 10 with the article 12 supported thereon is then moved along the transport path 14 to the next successive actuating station 26b, 26c, 26d respectively. This movement is achieved by moving the walking beam conveyor 10 from a loading or forward position 32, as seen in FIG. 1, to an extended or unloading position 34, as seen in FIG. 2. The walking beam conveyor 10 is then moved from a article supporting or raised position 30, shown in FIG. 3, to the retracted or lowered position 28, shown in FIG. 4, so the article is then supported at the next successive actuating station. Additional features of the apparatus and method for the movement of articles 12 between actuating stations 26a–26d, hereinafter referred to as actuating stations 26, will be more fully described herein.

To provide for movement of the articles 12 between the actuating stations 26, the walking beam conveyor 10 of the present invention includes a first and second set of rollers 36, 38 respectively which are supported by a support surfaces 40 of the rails 41. The rails 41 are secured to and supported by the bottom surface 24 of the pit 20. The sets of rollers 36, 38 are movable along the support surfaces 40 of rail 41 to allow movement of the walking beam conveyor 10 between the actuating stations 26 as will be hereinafter more fully described.

The walking beam conveyor 10 of the present invention has a walking beam 42 which is supported by the linkage mechanism 44 as seen in FIGS. 1–9. To support the articles 12 on the beam 42, the beam has movable supports 43 secured to the top 47 of the beam and the beam extends between any three of the actuating stations 26. The movable supports 43 are positioned on the beam so that when the beam is positioned at an actuating station and moved to the raised position 30, the movable supports 43 contact the article 12 and raise it so the article may be moved along the transport path 14. Conversely, when the beam is lowered, the article 12 supported on the movable supports 43 comes into contact with and subsequently is supported by the fixed holders 16 at an actuating station as the beam is moved to the lowered position 28.

The linkage mechanism 44 allows for movement of the beam 10 in a substantially vertical direction between the article supporting position 30 and a retracted position 28. The linkage mechanism 44 is supported on the rollers 36, 38 to allow for movement of the walking beam conveyor 10 in a substantially horizontal direction between the actuating stations 26. The set of front rollers 36 includes a right roller 36r and a left roller 36l and the set of rear rollers 38 includes a right roller 38r and a left roller 36l. The right rollers 36r and 38r are positioned on one side 82 of the walking beam 42 and the left rollers 36l and 38l are positioned on the other side 84 of the walking beam as seen in FIGS. 3 and 4. By positioning rollers 36, 38 on each side of the beam 42, the stability of the beam 42 is improved. The rollers 36, 38 are mounted on axles 45.

The linkage mechanism 44 includes support links 46 which are pivotally secured to each of the rollers 36, 38 about the rotational axis 36a, 38a of their respective rollers 36, 38. The support links 46 include forward support links 48 and rear support links 50. The linkage mechanism 44 will be described in connection with the rollers 36r and 38r as shown in FIGS. 6–9 and it should be understood that the same linkage mechanism 44 is provided with the rollers 36l and 38l positioned on the other side of the beam 42.

Figure 7:
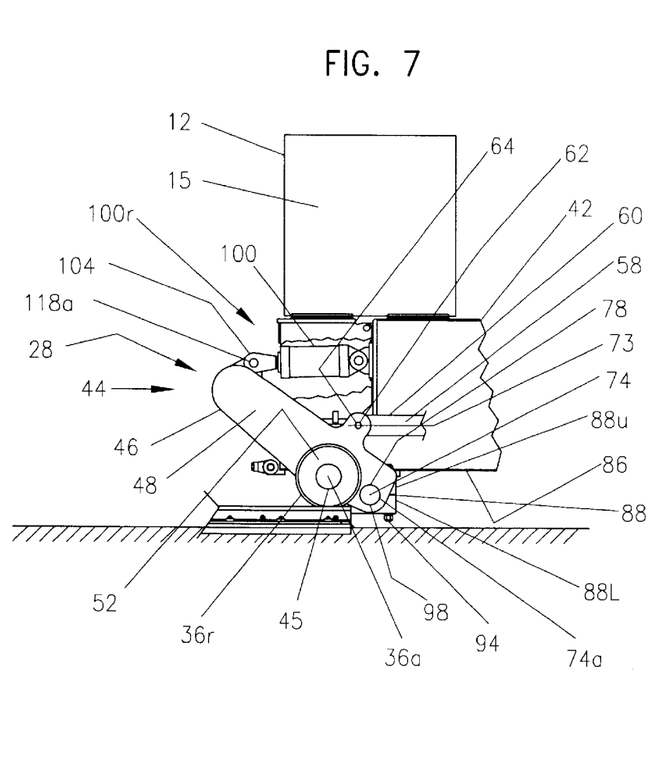
FIG. 7 is a view of the front end of the walking beam conveyor shown in FIG. 6 with the vertical driving device in a retracted or lowered position.
Figure 8:
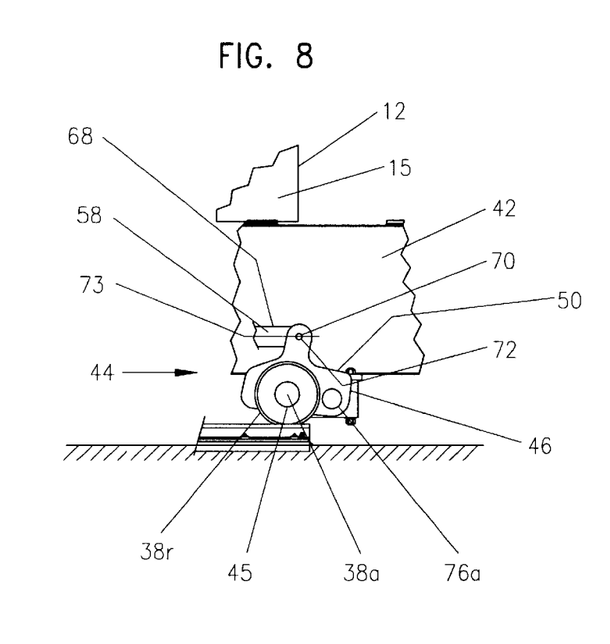
FIG. 8 is an expanded view of the rear linkage of the walking beam conveyor in the raised position.

The forward support link 48 has an aperture or bore 52 therein, as shown in FIG. 7, with a portion of the roller 36r cut away. The aperture 52 is adapted to be pivotally received by the axle 45 so that the forward support link 48 is rotatable about the rotational axis 36a of the roller 36r. Accordingly, the forward support link 48 is pivotally secured about a first pivot point or axis 36a of the roller 36r.

Figure 9:
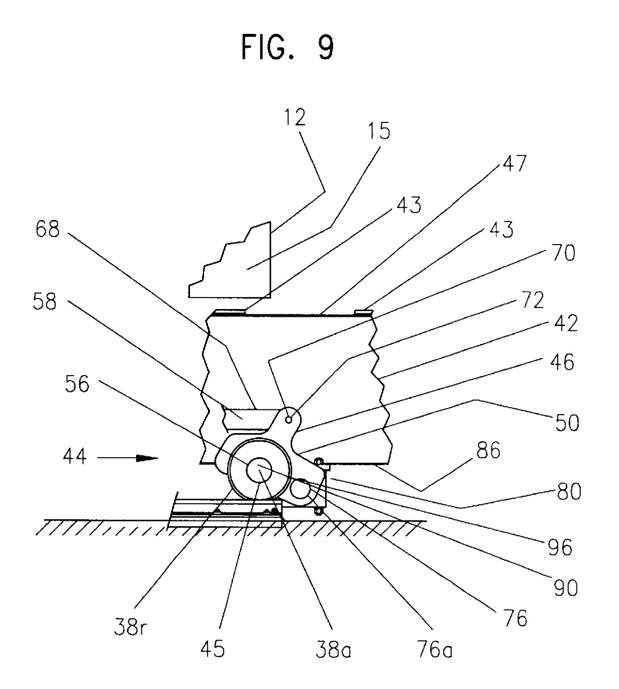
FIG. 9 is an expanded view of the rear linkage of the walking beam conveyor in the lowered position.

The rear support link 50 has an aperture 56 therein, as shown in FIG. 9 with a portion of the roller 38r cut away. The aperture 56 is adapted to be pivotally received by the axle 45 so that the rear support link 50 is rotatable about the rotational axis 38a of the roller 38r. Accordingly, the rear support link 50 is pivotally secured about a second pivot point or axis 38a of the roller 38r.

The linkage mechanism 44 also includes connecting links 58 on each side of the beam 42 which are provided to interconnect the support links 48, 50 and thereby substantially synchronize movement of the support links as shown in FIGS. 6–9. The connecting link 58 has a forward end 60 which is pivotally connected to the forward support link 48 about a pivot point or axis 62 by means of a pin 64 extending through both the forward end 60 of the connecting link 58 and the forward support link 48. The connecting link 58 has a rear end of 68 which is pivotally connected to the rear support link 50 about a pivot point or axis 70 by means of a pin 72 extending through both the rear end 68 of the connecting link 58 and the rear support link 50.

It is desirable that the force being transmitted by the connecting link 58 is in a direction that is substantially tangent to the arc of movement about the axes 62, 70. Since a line 73 connecting the axes 62, 70 is substantially horizontal, it is desirable that a line connecting the axes 62, 70 and the axes 36a, 38a respectively be in a substantially vertical direction. Since there is some arcing distance, it is also desirable to make the arcing distance equal on each side of the line of vertical to the line connecting the axes 62, 70 and the rotational axes 36a, 38a.

Such a design provides for improved synchronization of the angular movements of the support links 48, 50 and transmission of rotational force between the support links. The linkage 44 of the present invention allows the wheelbase or distance between wheels 36, 38 on each side of the walking beam 42 be varied depending various design configurations of the manufacturing operations in which the walking beam conveyor 10 is used. This is achieved by simply changing the length of connecting links 58.

The walking beam 42 is supported by the linkage mechanism 44 on the sets of rollers 36, 38 so the beam may be moved along the transport path 14 and also between the raised and lowered positions 30, 28 respectively. As seen in FIGS. 3, 7, and 9, the pins 74, 76 are provided to interconnect the support links 48, 50 to the walking beam 42. The support links 48, 50 have apertures or bores 78, 80 respectively for rotatably receiving the pins 74, 76 respectively therein for rotation about the rotational axes or pivot points 74a, 76a of the pins 74, 76 respectively. The pin 74 receives the support links 48 on both opposing sides 82, 84 of the beam 42 and extend across the bottom 86 of the beam. Split bushings 88 are provided on and secured to the bottom 86 of the beam 42 for rotatably receiving the pin 74 therein. The pin 76 receives the support links 50 on both sides 82, 84 of the beam 42 and extend across the bottom 86 of the beam. Split bushings 90 are provided on the bottom of the beam 42 for rotatably receiving the pin 76 therein in a similiar manner as described above in connection with the split bushings 88.

The split bushings 88, 90 are particularly advantageous since they allow for ease of maintenance and decrease manufacturing costs. For ease of description, the split bushings 88 and their interconnection to the beam 42 and support links 48 will be described below. It should be understood that the split bushings 90 interconnect the beam 42 and support links 50 in a similar fashion.

Figures 10, 11, 12:
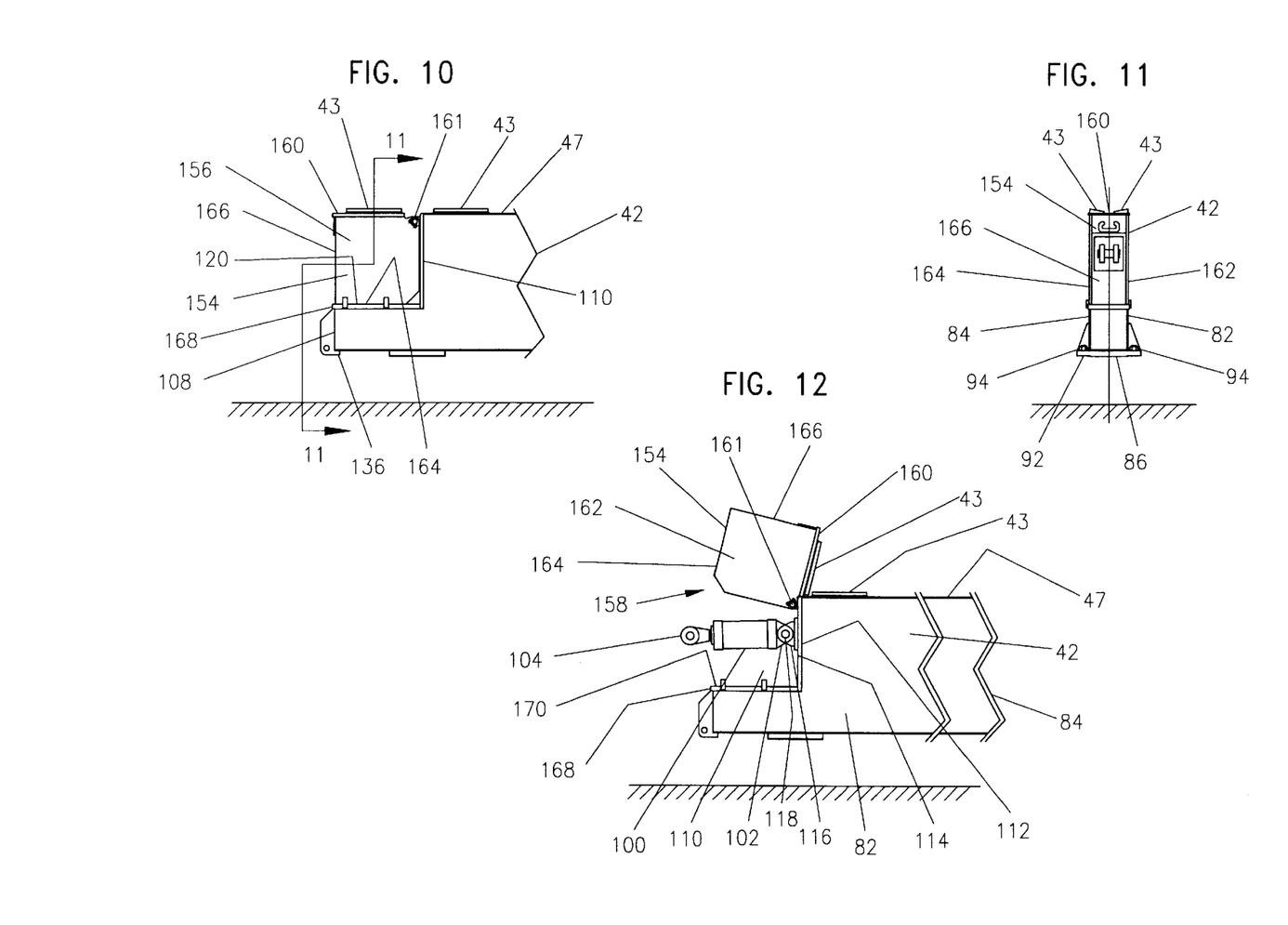
FIG. 10 is a side view of the front end portion of the walking beam conveyor of the present invention with a maintenance hood in the down position.
FIG. 11 is an end view of the front end portion of the walking beam conveyor showing a maintenance hood in the down position and taken along line 11—11 of FIG. 10.
FIG. 12 is a side view of the front end portion of the walking beam conveyor shown in FIG. 10 with the maintenance hood in a raised position.

As seen in FIGS. 3, 7 and 11, the bottom 86 of the beam 42 has a bushing support plate 92 which extends past the sides 82, 84 of the beam. A split bushing 88 is provided on both sides 82, 84 of the bushing support plate 92. The split bushings 88 have an upper bushing member 88u secured to the bushing support plate 92 and a lower bushing member 88l secured to the upper bushing member by means of the fasteners 94. The fasteners 94 are positioned in opening 96 extending through the upper and lower bushing member's 88l and 88u and the bushing support plate 92. The upper and lower bushing member's 88u and 88l are formed to provide an aperture 98 therethrough for rotatably receiving the pin 74 therein with support links 48 on each side of the beam 42 rotatably received by the pin 74. Accordingly, the beam 42 is pivotally connected to the support links 48 about the axis or pivot point 74a. As mentioned above, the split bushings 88 and their interconnection to the beam 42 and rear support links 50 are similarly provided for rotation of the axes 76a about the axis 38a.

In FIGS. 1, 3, 7 and 12, the linkage 44 of the present invention allows for the use of a vertical driving device or single hydraulic cylinder 100 to move the beam 42 between an article supporting or raised position 30, in which the article 12 is supported by one of the movable supports 43 on the beam, and a retracted or lowered position 28 in which the article 12 is supported by one of the fixed holders 16 at one of the actuating station 26. The vertical lift motion of the walking beam 42 is created with one lift cylinder 100 which is mounted close to the top 47 of the walking beam. The hydraulic cylinder 100 has the blind end 102 connected to the beam 42 and the rod end 104 pivotally connected to the support links 48 so that upon actuation of the hydraulic cylinder, the beam is moved between the article supporting position 30 and the retracted position 28. A crosslink 106 is provided to pivotally connect the support links 48 on each side 82, 84 of the beam 42 to the hydraulic cylinder 100.

To effectuate the connection between the beam 42 and the linkage 44 by the hydraulic cylinder 100, the end 108 of the beam 42 has a portion 110 cut out from the top 45 of the beam 42 as shown in FIGS. 1, 10 and 12. The cut out portion 110 includes a substantially vertical surface 112 on both the sides 82, 84 joined by a plate 114 extending across the sides of the beam 42 and defining a portion of the end 108 of the beam 42. A male clevis 116 is secured to the plate 114 and receives the blind end 102 of the cylinder 100 therein. A pin 118 extends through the male clevis 116 and the blind end 102 of the hydraulic cylinder 100 so that the blind end of the hydraulic cylinder is rotatably mounted to the clevis 116 about the rotational axes 118a of the pin 118. The clevis 116 and the cylinder 100 are centrally located between the sides 82, 84 of the beam 42 as will be hereinafter more fully described.

The rod end 104 of the hydraulic cylinder 100 is pivotally connected to the cross link 106 so that the linkage 44 may be moved upon actuation of the hydraulic cylinder as seen in FIGS. 1, 3, 6, and 7. The cross link 106 has a connecting member 120 secured to the center of the cross link and the support links 48 are connected to the ends 122 of the cross link 106. The connecting member 120 and the rod end 104 of the hydraulic cylinder 100 are rotatably connected by a pin 124 about the rotational axes or pivot point 124a.

Upon actuation of the hydraulic cylinder 100, the support links 48, 50 are rotated to consequently move the beam 42 between the article supporting position 30 and the retracted position 28. The ratio of the distance between the rotational axis 36a of the roller 36 and the pivot point 74a connecting the beam 42 to the support link 48 and the distance between the rotational axis 36a of the roller and the pivot axis 124a where the support link 48 connects to the hydraulic cylinder 100 is from between 1:2 to 1:3. It has been found that this ratio is preferred to provide sufficient lifting force on the beam 42, and vertical travel of the beam within the physical and design parameters required to achieve other favorable features of the present invention.

A drive motor 128, such as an hydraulic cylinder, is provided to move the beam 48 along the support surface 40 and consequently move the article 12 between the actuating stations 26a–26d as shown in FIGS. 1, 2 and 5. The hydraulic cylinder or drive motor 128 has one end 130 pivotally secured by means of a trunion 132 to the stationary bottom surface 24 of the conveyor pit 20. The other end 134 of the hydraulic cylinder 128 is pivotally connected to the beam 42. As shown in FIG. 10, the end 108 of the beam 42 has a pivot plate 136 secured thereto for pivotally securing the rod end 134 of the hydraulic cylinder 128 to the beam. The hydraulic cylinder 128 moves the walking beam 42 between a loading position 138, as seen in FIG. 1, and an unloading position 140, shown in FIG. 2, as will be hereinafter more fully described.

The walking beam conveyor 10 of the present invention provides for the intermittent movement of articles 12 along a transport path 14 as seen in FIGS. 1,2, 3, 5, 6, and 7. Such movement of the articles 12 is achieved by positioning the movable supports 43 of the walking beam 42 below the articles 12 supported by the fixed holders 16 and located at the actuating stations 26a–26d. At the start of this operational cycle, the walking beam 42 is vertically in a retracted or lowered position 28, shown in FIGS. 1, 4, and 7 and horizontally in a loading position 138 shown in FIGS. 1 and 7.

Figure 6:
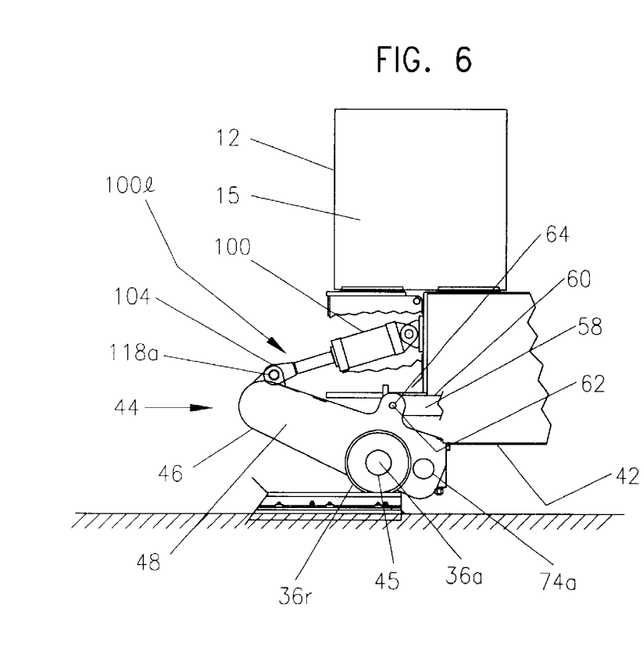
FIG. 6 is an expanded view of the front end of the walking beam conveyor shown in FIG. 1 with the vertical driving device in an extended position.

The walking beam is then moved in substantially a vertical direction from the lowered position 28 to the raised position 30 shown in FIGS. 3 and 6. To provide this movement, the hydraulic cylinder 100 is activated to move from its lowered position 100l to its raised position 100r. A hydraulic circuit 142 is provided for supplying pressurized hydraulic fluid to the cylinder 100 to move the cylinder from its lowered to its raised position 100 l, 100r respectively. A source of pressurized fluid 144 provides pressurized fluid through the port "P" to the valve 146. The valve 146 is moved from a neutral position 148, to a raising position 150 in which the pressurized fluid is supplied to the cylinder 100 so that the cylinder moves from its lowered to its raised position 100l, 100r, respectively. The valve 146 also has a lowering position 152 in which the pressurized fluid is supplied to the cylinder 100 so that it moves from its raised position to its lowered position 100r, 100l, respectively. Flow control valves 153 are provided to control the speed movement of the cylinder 100 between the positions 100r, 100l.

Accordingly, when the valve 146 is moved to its position 150, the cylinder 100 moves the beam 42 from its lowered position 28 to its raised position 30. At the beginning of such movement, the article 12 is supported by the fixed holders 16 and as the beam 42 moves in a vertically upward direction, the movable supports 43 come into contact with the peripheral surface 15 of the articles 12 and raise and support the articles above the fixed holders 16. As the cylinder 100 is so moved, the cylinder creates a force on the rotational axes 118a moving the forward support links 48 about the rotational axis 36a and consequently moving the rotational axes 74a and 62 to raise the beam 42 as seen in FIGS. 6 and 7. The connecting link 58 transmits such rotational force to the rear support links 50 through the pivot point 70 so that the rear support link is likewise moved from its lowered, shown in FIG. 9 to its raised position, shown in FIG. 8.

With the article 12 supported on the walking beam 42 as shown in FIGS. 1, 2, and 5, the hydraulic cylinder 128 is actuated to move the walking beam from the loading or forward position 32 along a transport path 14 to the unloading or extended position 34. In the unloading position 140, the articles 12 are positioned above the next successive actuating stations 26. For example, if an article was positioned at the actuating stations 26a, it is moved to the next actuating stations 26b. In this position, the article 12 is positioned above the fixed holders or liners 16 of the next actuating station.

Figure 13:
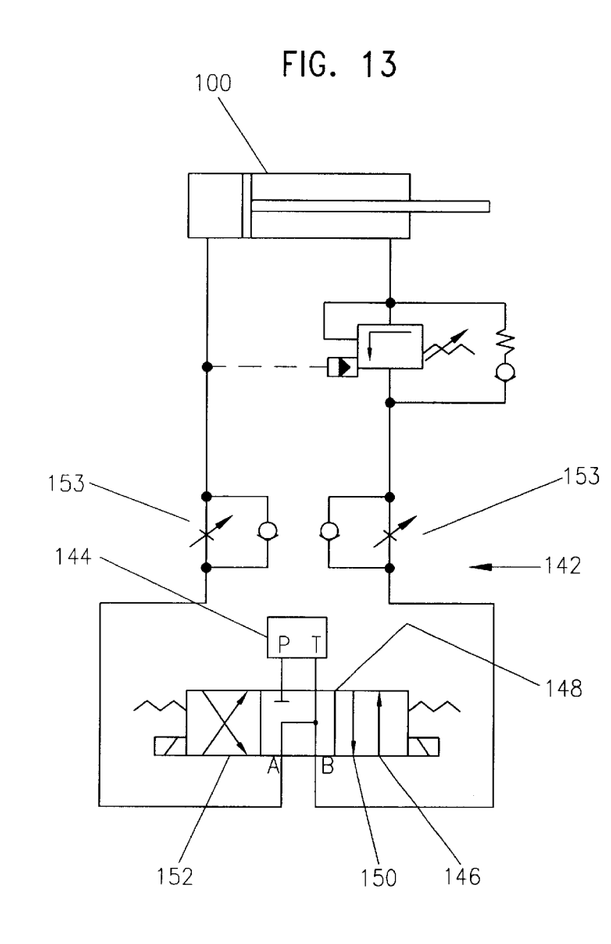
FIG. 13 is a schematic diagram for the hydraulic circuitry for operating the hydraulic cylinder which provides for the raising and lowering of the walking beam conveyor.

The article 12 is then lowered so that it is supported by the fixed holders 16 of the next actuating station. To lower the article, the valve 146 is moved to the position 152, as shown in FIG. 13, so that the cylinder 100 moves from the raised position 100r to the lowered position 100l. During this movement the article comes into contact with the fixed holders 16 and is subsequently supported by the fixed holders. The walking beam 42 is then moved from its unloading position 140 to its loading position 138 by actuation of the hydraulic cylinder 128. This cycle is repeated to move the article 12 along the transport path 14.

A maintenance hood 154 is provided for covering the hydraulic cylinder 100 during normal operation of the walking beam conveyor 10 of the present invention. As seen in FIGS. 10, 11 and 12, the maintenance hood 154 is movable between a covering position 156, in which the hydraulic cylinder 100 is covered during normal operation of the walking beam conveyor, and an open position 158 in which the hydraulic cylinder is exposed and may be maintained. The maintenance hood 154 has a top surface 160 substantially coplanar with the surface 47 of the beam 42 when the cover is in the covering or closed position 156. The top surface 160 has movable supports or liners 43 mounted thereto which are substantially coplanar with the movable supports 43 on the top 47 of the beam 42 when the cover is in the covering or closed position 156. A hinge 161 is provided to pivotally mount the maintenance hood 154 to the beam 42 to achieve such a coplanar position when the hood is in the closed position 156 while allowing the hood to be moved to the open position 158. It should be understood that a wide variety of designs may be used to allow the hood 154 to be maintained in a covering position 156 and removed from that position to allow for maintenance of the walking beam 42.

To cover the cylinder 100 and a portion of the linkage 44 when in the covering position 156, the maintenance hood 154 has side portions 162 extending outwardly from the top portion 160 and terminating in a lower edge 164 and a front portion 166 between the top portions 160 and side portions 162. The beam 42 as a support plate 168 extending between the sides 82, 84 to provide a support surface 170 for contacting the lower edge 164 of the maintenance hood when in the covering position 156. Guides 172 are provided on the support plate 168 extending above the support surface 170 to maintain the maintenance hood 154 in its closed position supported by the beam 42. By positioning the cylinder 100 in the center of the beam 42 as described above, the cylinder may be mounted close to the top of the beam 42 and readily covered by the maintenance hood 154.

Such a design provides for easy maintenance of the driving mechanism and also protects the cylinder 100 and linkage 44 from physical damage and contamination by dust, dirt or other foreign particles. The maintenance hood 154 also provides quick access to the cylinder 100 and linkage 44 without removing or disassembly of the walking beam conveyor 10, and maintenance time is minimized as the possibility of incorrect reassembly of the walking beam after the maintenance is completed. The maintenance hood 154 also acts as a structural member to support the articles 12 as they are supported by the walking beam conveyor 10 and moved between the actuating stations 26.

Figure 14:
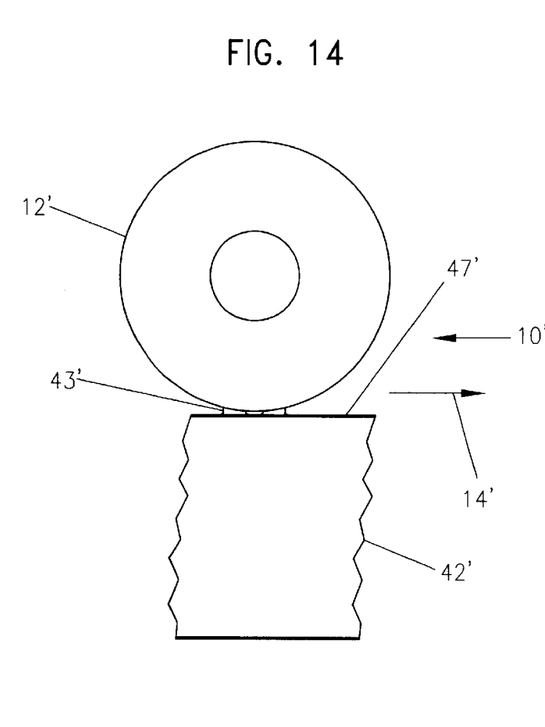
FIG. 14 is a side view of the walking beam conveyor showing an alternative position of the movable supports on the beam.

It should be recognized that the movable supports or liners 43 may be positioned otherwise than that shown as described above. FIG. 14 shows another embodiment of the present invention which is similar in construction with the walking beam conveyor 10 described above. For use of description, the walking beam 10' is numbered with the numerals the same as used in connection with the walking beam conveyor 10 to denote common parts where appropriate and followed by a prime (') marked to denote the walking beam conveyor 10'. As shown in FIG. 14, the movable supports or liners 43' may be repositioned on the top 47' of the walking beam 42' so that the article 12' is carried along the transfer path 14' at 90 degrees with respect to the position of the article 12 as it is transferred by the conveyor 10 as described above. It should be understood that both the movable supports and the fixed supports may be re-oriented and designed to carry articles having a wide variety of configurations.

The invention has been described with reference to the preferred embodiments. Obviously, modifications or alterations will occur to others upon reading and understanding the specification. It is my intention to include all modifications and alterations insofar as they come within the scope of the appended claims or equivalents thereof.

Having described my invention, I claim:

1. A walking beam conveyor for the intermittent movement of articles along a transport path comprising:
   fixed holders positioned along the transport path for receiving the articles to be advanced,
   at least two actuating stations at spaced apart locations along the transport path,
   a roller support surface,
   at least a first roller and at least a second roller supported by said support surface and movable therealong,
   a first support link pivotally secured about a first pivot point to said first roller,
   a second support link pivotally secured about a second pivot point to said second roller,
   a connecting link interconnecting said first and second support links to substantially synchronize movement of said first and second support links,
   a beam pivotally secured about a third pivot point to said first support link and pivotally secured about a fourth pivot point to said second support link to support said beam on said rollers, said beam spanning at least two of said actuating stations,
   at least two movable supports secured to said beam to support the article on said beam when the article is moved between said actuating stations,
   a hydraulic cylinder for moving said beam in a substantially vertical direction between an article supporting position in which the article is supported by one of said movable supports and a retracted position in which the article is supported by one of said fixed holders, said hydraulic cylinder having one end connected to said beam and an other end pivotally connected to one of said support links about a fifth pivot point, and
   a drive motor for moving said beam along said support surface to move the article between said actuating stations.

2. A walking beam conveyor for the intermittent movement of articles along a transport path as described in claim 1 which includes:
   a first and a second pair of rollers supported by said support surface and movable therealong,
   said beam having opposing sides,
   each of said pair of rollers having one roller positioned on one side of said beam and another roller positioned on the other side of said beam,
   a pair of first support links, each of said first pair of rollers having a first support link pivotally secured thereto,
   a pair of second support links, each of said second pair of rollers having a second support link pivotally secured thereto,
   connecting links interconnecting said first and second pairs of support links to substantially synchronize movement of said first and second pairs of support links, and
   a cross link connecting said other end of said hydraulic cylinder to said first pair of support links for moving said beam between the article supporting position and the retracted position upon movement of said hydraulic cylinder.

3. A walking beam conveyor for the intermittent movement of articles along a transport path as described in claim 1 in which the ratio of the distance between said first pivot point and said third pivot point and the distance between said first pivot point and said fifth pivot point is from between 1:2 to 1:3.

4. A walking beam conveyor for the intermittent movement of articles along a transport path as described in claim 1 which includes:
   a maintenance hood for covering said hydraulic cylinder when in a covering position and exposing said hydraulic cylinder for maintenance when in an open positioned.

5. A walking beam conveyor for the intermittent movement of articles along a transport path as described in claim 4 in which:
   said maintenance hood has a hood top surface and said beam has a beam top surface, said beam and hood top surfaces being substantially coplanar when said hood is in said covering position, said movable supports secured to said beam top surface and said hood top surface.

6. A walking beam conveyor for the intermittent movement of articles along a transport path as described in claim 4 which includes:
   a hinge pivotally interconnecting said beam and said maintenance hood to allow for movement of said maintenance hood between said covering position and said open position.

7. A walking beam conveyor for the intermittent movement of articles along a transport path as described in claim 1 in which said connecting link is pivotally connected to said first support link about a sixth pivot point and said connecting link is pivotally connected to said second support link about a seventh pivot point, said sixth and seventh pivot points positioned so that a distance between a line interconnecting said sixth and seventh pivot points and the first pivot point of said first roller is substantially maximized.

8. A walking beam conveyor for the intermittent movement of articles along a transport path as described in claim 7 in which said sixth pivot moves about the first pivot point in an arc and the sixth pivot point is positioned so the arc the sixth pivot point moves through is substantially equal on each side of the line interconnecting said sixth and seventh pivot points and said first pivot point.

9. A walking beam conveyor for the intermittent movement of articles along a transport path as described in claim 1 in which said connecting link is pivotally connected to said first support link about a sixth pivot point and said connecting link is pivotally connected to said second support link about a seventh pivot point, said sixth and seventh pivot points positioned so that a distance between a line interconnecting said sixth and seventh pivot points and the second pivot point of said second roller is substantially maximized.

10. A walking beam conveyor for the intermittent movement of articles along a transport path as described in claim 1 in which said connecting link is pivotally connected to said first support link about a sixth pivot point and said connecting link is pivotally connected to said second support link about a seventh pivot point, said sixth and seventh pivot points positioned so that a line interconnecting said sixth and seventh pivot points is substantially tangent to an arc about said first pivot point.

11. The walking beam conveyor for the intermittent movement of articles along a transport path as described claim 1 wherein said first pivot point is the rotational axis of said first roller and said second pivot point is the rotational axis of said second roller.

12. A walking beam conveyor for the intermittent movement of articles along a transport path comprising:
    fixed holders positioned along the transport path for receiving the articles to be advanced,
    at least two actuating stations at spaced apart locations along the transport path,
    a beam spanning at least two of said actuating stations for moving the article between said actuating stations,
    at least two movable supports secured to said beam to support the article on said beam when the article is moved between said actuating stations,
    at least two movable supports secured to said beam to support the article on said beam when the article is moved between said actuating stations,
    a linkage mechanism connected to said beam for raising and lowering said beam
    a hydraulic cylinder connected to said linkages for moving said beam in a substantially vertical direction between an article supporting position in which the article is supported by one of said movable supports and a retracted position in which the article is supported by one of said fixed holders, and
    a maintenance hood for covering said hydraulic cylinder when in a covering position and exposing said hydraulic cylinder for maintenance when in an open positioned.

13. A walking beam conveyor for the intermittent movement of articles along a transport path as described in claim 12 in which:
    said maintenance hood has a hood top surface and said beam has a beam top surface, said beam and hood top surfaces being substantially coplanar when said hood is in said covering position, said movable supports secured to said beam top surface and said hood top surface.

14. A walking beam conveyor for the intermittent movement of articles along a transport path as described in claim 12 which includes:
    a hinge pivotally interconnecting said beam and said maintenance hood to allow for movement of said maintenance hood between said covering position and said open position.

15. A walking beam conveyor for the intermittent movement of articles along a transport path as described in claim 12 which includes:
    a roller support surface,
    at least a first roller and at least a second roller supported by said support surface and movable therealong,
    said linkage mechanism including a first and second support link and a connecting link, said first support link pivotally secured about a first pivot point to said first roller,
    said second support link pivotally secured about a second pivot point to said second roller, said the connecting link interconnecting said first and second support links to substantially synchronize movement of said first and second support links,
    said beam pivotally secured about a third pivot point to said first support link and pivotally secured about a fourth pivot point to said second support link to support said beam on said rollers,
    said hydraulic cylinder having one end connected to said beam and an other end pivotally connected to one of said support links about a fifth pivot point, and
    a drive motor for moving said beam along said support surface to move the article between said actuating stations.

* * * * *